July 4, 1961  J. B. SHAW ET AL  2,991,336
ELECTRICAL TROLLEY SYSTEMS, LOW REACTANCE TYPE
Filed Sept. 10, 1956  2 Sheets-Sheet 1
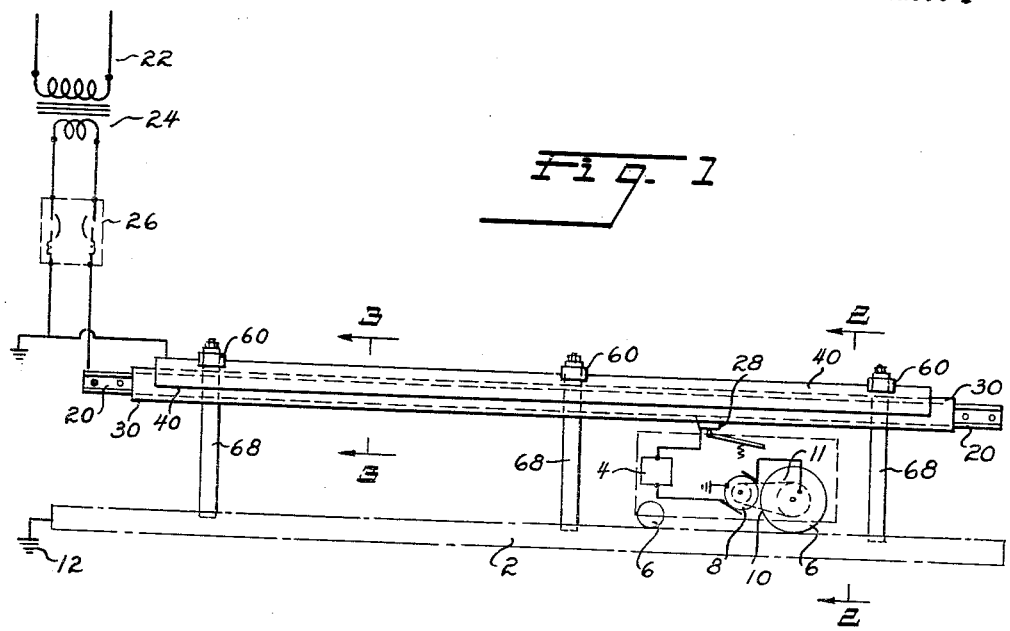
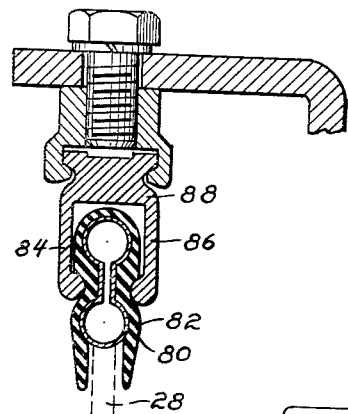
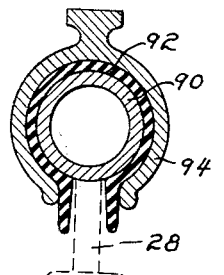
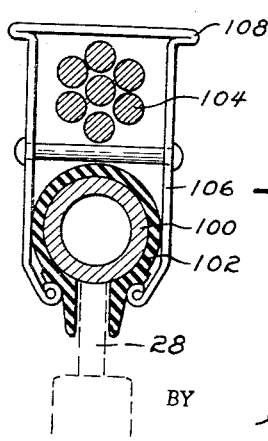
INVENTORS
JOHN B. SHAW
TIREY L. FORD
CECIL J. MAYO
BY  *Scrivener & Parker*
ATTORNEYS INVENTORS
JOHN B. SHAW
TIREY L. FORD
CECIL J. MAYO
BY Scrivener & Parker
ATTORNEYS

United States Patent Office 2,991,336
Patented July 4, 1961

2,991,336
ELECTRICAL TROLLEY SYSTEMS, LOW REACTANCE TYPE
John B. Shaw, Redwood City, and Cecil J. Mayo and Tirey L. Ford, Hillsborough, Calif., assignors to Insul-8-Corp., San Carlos, Calif., a corporation of California
Filed Sept. 10, 1956, Ser. No. 608,731
2 Claims. (Cl. 191—2)

This invention relates broadly to electrical systems of the type in which a moving vehicle or carriage takes electric energy from a fixed conductor bar by means of a sliding contact or collector device carried by the vehicle, moving therewith and engaging the conductor bar, to thereby operate an electric motor which drives either the vehicle or some device carried by it, or both. More particularly, the invention has to do with means for providing an electric system of the described type in which the conductor bar and the return conductor are in such close proximity as to reduce to a minimum losses due to inductive reactance.

In alternating current systems of the described type considerable losses due to inductive reactance occur when the return conductor is separated by a material distance from the conductor bar which is connected to the source of electric energy, while these losses are reduced when these conductors are in close proximity. This reduction in inductive reactance loss is due to the fact that the magnetic fields produced by the conductor bar and the return conductor substantially cancel each other if the bar and the return are closely contiguous. This magnetic coupling is, in general, indirectly proportional to the spacing between the conductor bar and the return, and becomes negligible when the spacing is considerable, in which case the losses due to inductive reactance may exceed those due to resistance. For example, in a typical installation of a car movable along tracks and taking electric energy from a fixed conductor bar extending parallel to the tracks, one track was used as the ground return and was spaced from the conductor bar by a distance sufficiently great that there was negligible magnetic coupling between the fields of the conductor bar and the track. In this installation losses due to inductive reactance were approximately five times as great as those due to resistance.

It has accordingly been the principal object of this invention to provide a conductor bar installation for use in a system of the described type which will include return means in very close proximity to the conductor bar, whereby there will be maximum coupling between the fields of the two with consequent maximum reduction of losses due to inductive reactance. A second, but also important, object of the invention has been to provide a return means for an electrical system including a conductor bar, which return means provides a support for the conductor bar and imparts lateral rigidity thereto. A further object of the invention has been to provide, in a system of the described type, a return circuit of substantially lower resistance than provided by the conventional track rail when used as a return conductor.

The invention is described in the following specifications and illustrated in the accompanying drawings, in which FIG. 1 is partly a side elevational view and partly a schematic circuit diagram of a system for delivering electric energy to a moving vehicle according to the invention;

FIG. 3 is a sectional view taken on line 3—3 of FIG. 1 showing a second form which the conductor bar and return bar of the invention may take;

FIG. 4 is a sectional view taken on the same line as FIG. 3 and showing a third form which the conductor bar and return bar of the invention may take, and FIG. 5 is a sectional view taken on the same line as FIG. 3 and showing a fourth form which the conductor bar and return bar of the invention may take.

Figure 2:
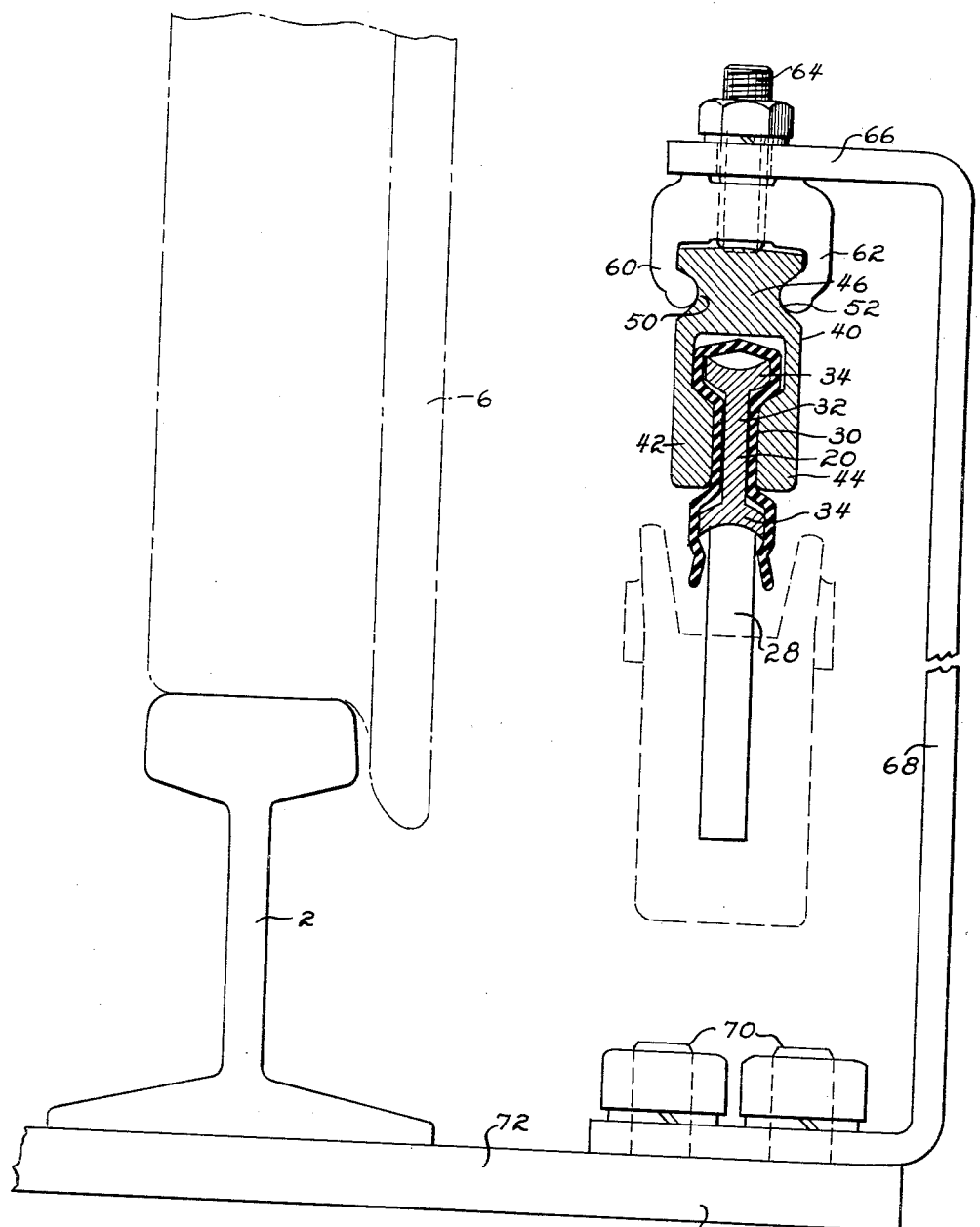
FIG. 2 is a part sectional and part elevational view taken on line 2—2 of FIG. 1 showing a preferred form of the invention.

In FIG. 1 of the drawings there is disclosed a track 2, which may be one of two or more tracks, on which a vehicle 4 is supported by wheels 6 on which the vehicle moves along the track. An alternating current electric motor 8 is mounted on the vehicle and has its armature connected by suitable mechanical means 10 to the wheels 6 to rotate the same. One terminal of the motor is grounded through the wheels 6 as shown at 11 and the track is grounded as shown at 12.

Means must be provided for supplying electric energy to the motor 8 and a preferred means for accomplishing this is disclosed in FIGS. 1 and 2 of the drawings. Such means comprise an elongated conductor bar 20 which is connected to the power terminal of a source of alternating electric energy 22 through a transformer 24 and circuit breaker 26. This conductor bar extends in parallel relation to the track 2 and is spaced from the track by any distance which permits the bar to be slidably engaged by a collector device 28 which is mounted on the vehicle 4. The conductor bar 20 is partially surrounded and encased throughout substantially its entire length by a sheath 30 which is formed of electrically insulating material and which is of inverted U-shape, being open at the bottom to permit the collector device to engage the conductor bar. In the embodiment of the invention which is disclosed in FIG. 2 the conductor bar is I-shaped in cross section and has a flat central web 32 and upper and lower cross heads 34 each of which has a concave outer surface for better engagement by the collector device 28. The insulating sheath 30 conforms in general to the cross-sectional shape of the conductor bar 20 and therefore has enlarged upper and lower parts which receive the cross heads 34 of the conductor bar and a narrower central part which engages the side walls of the central web 32.

The conductor bar 20 and sheath 30 are supported in the described position with respect to the track by means which are in very close proximity to the bar throughout its length and which provide a return path for electric energy supplied to the conductor bar. These means comprise an elongated metallic member 40 which may be formed of aluminum and which is of inverted U-shape in cross-section having spaced depending arms 42, 44 which are thicker in cross-section adjacent their lower ends than at their upper ends, thus providing an upper recess within which may be received the upper cross-head of the I-shaped conductor bar 20 and the part of the sheath 30 which surrounds and encloses it, while the thicker lower parts of the depending legs 42, 44 extend toward and enclose the central web 32 of the conductor bar and the side walls of the insulating sheath 30 which lie in face-to-face contact with the sides of the web. The upper cross-piece or head 46 of the member 40, which connects the upper ends of the depending arms 42, 44 is of considerable vertical thickness and large cross-section whereby, with the depending legs 42, 44 of large cross section, a low resistance return path to the circuit breaker 26 and transformer 24 and the source of power is provided as described hereinafter.

The elongated bar 40 is provided with longitudinally extending grooves 50, 52 in its side walls which preferably extend entirely along the length of the member 40. These grooves are provided to receive the inturned ends of depending arms 60, 62 which form parts of short connecting members which are connected, as by bolts 64, to the upper horizontal arms 66 of C-shaped brackets 68 which are connected, as by bolts 70, to the surface such as the metal cross ties 72, which support the track 2, thereby electrically connecting the return member 40 to the track rail 2. However, if the track is not connected to ground the member 40 will provide a return path, thus completing the circuit.

It will be seen from the foregoing description that the elongated return bar 40 provides a return path for electric energy supplied to the conductor bar 20 as bar 40 is connected at spaced points throughout its length through the short supporting members 60 and the C-shaped supports 68 which may or may not be grounded at 12 as shown in FIG. 1. Further, it will be seen that the return member 40 receives and substantially surrounds the conductor bar 20 being open only along its lower side to permit the collector device 28 to engage the conductor bar, and also is in very close proximity to the conductor bar, being separated from it only by the thickness of the insulating sheath 30. Because of this surrounding and closely adjacent relationship of the conductor bar and the return lead or bar, substantial magnetic coupling will be caused between them thus reducing to a minimum losses in the system due to inductive reactance.

It will be understood that FIG. 1 of the drawing discloses only a single length of conductor bar, insulating sheath and return bar, but that additional lengths of each of these members may be arranged in end to end relation and connected in any suitable manner to provide an electrical conductor and collection system of any desired length.

The invention is not limited in any way to the use of conductor bars or return bars having the cross-sectional shapes disclosed in FIG. 2 and bars of other cross-sectional shapes and arrangements are disclosed in FIGS. 3, 4 and 5. One such embodiment of the invention is disclosed in FIG. 3 and comprises an elongated bar 80 which is 8-shaped in cross section, this being a standard commercial product, surrounded on all but its lower side by a sheath 82 formed of electrically insulating material and being of inverted U-shape in cross section in order to permit the collector device 28 to slidably engage the conductor bar, which is connected to the source of power in the same manner as the conductor bar 20 of FIG. 2. The conductor bar 80 and sheath 82 may preferably have the construction disclosed in the copending application of Tirey L. Ford and Donald H. Scofield, filed December 12, 1955, Serial No. 522,789. The outer surfaces of the side walls of the sheath 82 are provided with longitudinally extending grooves which receive the inturned ends of the depending side walls 84, 86 of an elongated metallic member 88 which is of inverted U-shape in cross section and which extends substantially throughout the length of the conductor bar and may be connected to ground in the same manner as the bar 40 of FIG. 2, but if not connected to ground will nevertheless complete the circuit which includes the source of alternating current and the conductor bar.

A further form which the conductor bar and the return bar may take is disclosed in FIG. 4, and comprises an elongated conductor bar 90 which is circular in cross section, and which may be hollow or solid, an elongated sheath 92 formed of insulating material and surrounding and engaging the entire periphery of the conductor bar 90 except a part thereof which is sufficiently wide to permit engagement by the collector device 28, and an elongated return bar 94 which surrounds and engages the entire periphery of the insulating sheath 92 except that part thereof which is open to permit access by the collector device. The return bar 94 is provided with means which may be engaged by the supporting devices 60, 68 in order to position it in spaced relation to the track 2 as described hereinbefore. It will be seen that in this and similar embodiments of the invention the conductor bar, which is connected to power, and the return bar are substantially concentric.

In a further embodiment of the invention, an example of which is disclosed in FIG. 5, the conductor bar and the return bar are disposed in close side-by-side relation for the reasons and with the results set forth hereinbefore. In the embodiment of FIG. 5 the conductor bar, which is connected to power, is shown at 100 and is surrounded on all but its lower side by a sheath 102 which is formed of electrically insulating material. An elongated cable or bar 104 is disposed adjacent and in side-by-side close relation to the bar 100 and the entire assembly of conductor bar, sheath and return bar is supported within an elongated member 106 of inverted U-shape which is provided at or adjacent its upper part with means 108 for engagement by the supporting means 60, 68 whereby it may be positioned in the spaced relation to track 2 as described hereinbefore. The member 106 is open at its lower part, as is the insulating sheath 102, to permit access to the conductor bar 100 by the sliding collector device 28. The bar or cable 104 is connected to ground at 12 through the U-shaped member 106 and the parts which support it, as described hereinbefore, and which therefore provides a return path for alternating current supplied to the conductor bar 100 in close proximity to the conductor bar for the reasons and with the results set forth.

In this specification we have described the member 40 and its equivalent members (88 of FIG. 3, 94 of FIG. 4, and 104 of FIG. 5) as being connected to ground through the track rail. It will be understood, however, that such a connection to ground is not required for successful operation of the system, and that the track rail may, in fact, be insulated from ground, in which case the members 40, 88, 94 and 104 will themselves complete the circuit which includes the source of electric energy and the conductor bar.

While the invention has been described in this application in connection with a conductor bar which is slidably engaged at its bottom part by a collector device, it will be understood that the invention is not limited in any way to such a conductor bar but, on the contrary, is sufficiently broad to include all conductor bars which may be slidably engaged by a collector device, whether on the bottom, side, top or elsewhere.

While we have described and illustrated one embodiment of our invention, it will be apparent to those skilled in the art to which the invention relates that other embodiments, as well as modifications of that disclosed, may be made and practised without departing from the spirit or scope of the invention, for the limits of which reference must be made to the appended claims.

What is claimed is:

1. A low reactance conductor assembly for supplying alternating current to a movable apparatus which is mounted for movement on and along an elongated track and is provided with a current collector device, said conductor assembly comprising an elongated conductor bar, an elongated sheath formed of electrical insulating material which is U-shape in cross section and closely embraces said conductor bar to permit the collector device to have access to one part of the conductor bar through the open side of the sheath, an elongated metallic member which is U-shaped in cross section and has its side legs closely embracing the side legs of the sheath and its open side registering with the open side of the sheath, the sheath being positioned between and in contact with the conductor bar and the elongated metallic member to insulate the bar and elongated metallic member from each other, the conductor bar, sheath and metallic member being substantially co-extensive in length, means for electrically connecting the conductor bar to one terminal of a source of alternating current, means for electrically connecting the elongated metallic member to a second terminal of said source of alternating current, and means for electrically connecting the elongated metallic member to the conductor bar through the current collector device and movable apparatus whereby the elongated metallic member provides in use a return path to ground for current supplied to the conductor bar.

2. A low reactance conductor assembly for supplying alternating current to a movable apparatus which is mounted for movement on and along an elongated track and is provided with a current collector device, said conductor assembly comprising an elongated conductor bar which in cross section has two spaced enlarged parts connected by a flat web, an elongated sheath formed of electrical insulating material which is U-shape in cross section and closely embraces one of the enlarged parts and extends over both sides of the web part of the conductor bar thus permitting the collector device to have access to the other enlarged part of the conductor bar through the open side of the sheath, an elongated metallic member which is U-shape in cross section and has a part closely adjacent the closed side of the sheath and side legs of enlarged thickness embracing the side legs of the sheath and holding the same in engagement with the sides of the web of the conductor bar, the sheath being positioned between and in contact with the conductor bar and the elongated metallic member to insulate the bar and elongated member from each other, the conductor bar, sheath and metallic member being substantially coextensive in length, means for electrically connecting the conductor bar to one terminal of a source of alternating current, means for electrically connecting the elongated metallic member to a second terminal of said source of alternating current, means for electrically connecting the elongated metallic member to the conductor bar through the current collector device and movable apparatus whereby the elongated metallic member provides in use a return path to ground for current supplied to the conductor bar.

References Cited in the file of this patent

UNITED STATES PATENTS

| | | |
|---|---|---|
| 276,953 | Bentley | May 1, 1883 |
| 457,105 | Boynton | Aug. 4, 1891 |
| 531,614 | Guilleaume | Dec. 25, 1894 |
| 907,712 | Armstrong | Dec. 29, 1908 |
| 1,625,125 | Latour | Apr. 19, 1927 |
| 1,672,915 | Schwarzenhauer | June 12, 1928 |
| 2,038,240 | Schelkunoff | Apr. 21, 1936 |
| 2,427,475 | Ringe | Sept. 16, 1947 |
| 2,614,179 | Donaldson et al. | Oct. 14, 1952 |
| 2,668,199 | Connell | Feb. 2, 1954 |
| 2,675,434 | Herrmann | Apr. 13, 1954 |
| 2,704,309 | Ford et al. | Mar. 15, 1955 |
| 2,767,241 | Zuch | Oct. 16, 1956 |